United States Patent [19]

Diddens et al.

[11] 4,300,074
[45] Nov. 10, 1981

[54] VIDEO COUPLING SYSTEM

[75] Inventors: Paul A. Diddens, Denver; Robert E. Humphrey, Englewood, both of Colo.

[73] Assignee: Honeywell Inc., Minneapolis, Minn.

[21] Appl. No.: 30,076

[22] Filed: Apr. 13, 1979

[51] Int. Cl.³ .................... H01J 29/70; H01J 29/76
[52] U.S. Cl. ................................. 315/401; 315/381
[58] Field of Search ............ 315/381, 383, 30, 401; 307/311, 318

[56] References Cited

U.S. PATENT DOCUMENTS 3,562,578 2/1971 Takahashi ...................... 315/401
3,795,836 3/1974 Nilsson ............................ 315/30

OTHER PUBLICATIONS

The Radio Amateur's Handbook, American Radio Relay League, Newington, Conn., 1973 Fiftieth Edition, pp. 80 and 81.

Primary Examiner—Theodore M. Blum
Attorney, Agent, or Firm—Lockwood D. Burton; Mitchell J. Halista

[57] ABSTRACT

A voltage buffering coupling circuit for coupling a ground-referenced control signal to a high voltage biased CRT includes all solid state elements, thereby avoiding the tendency of the arc breakdown characteristic of gaseous voltage regulator tubes. The circuits include temperature compensating elements of opposite thermal coefficient characteristics.

6 Claims, 4 Drawing Figures

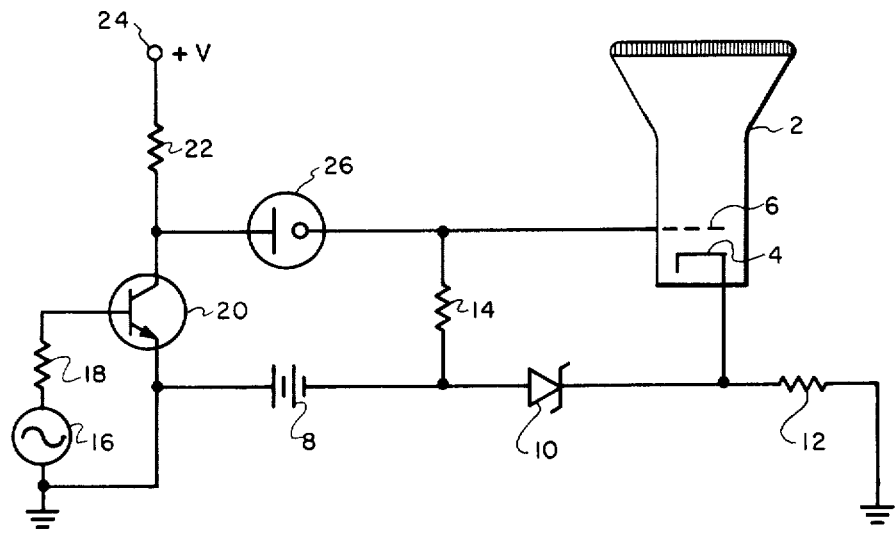
F I G. I (PRIOR ART)
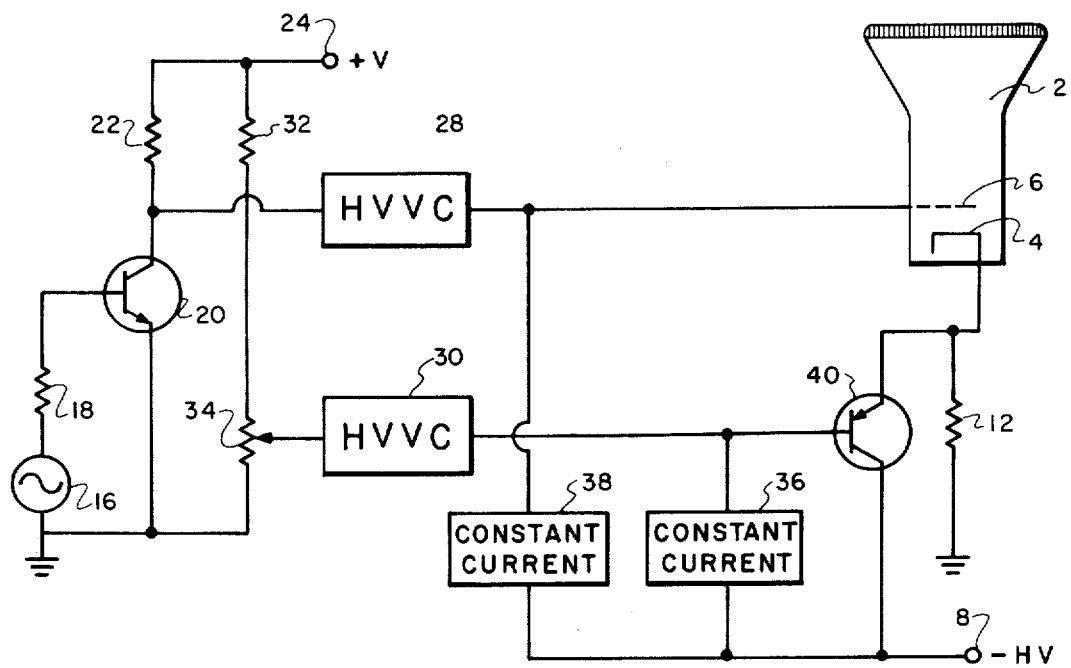
F I G. 2

VIDEO COUPLING SYSTEM

BACKGROUND OF THE INVENTION

The present invention relates to cathode ray tube control circuits. More particularly, it relates to a controlled signal coupling circuit for cathode ray tube apparatus.

In the art relating to cathode ray tube (CRT) display or recording apparatus, a relatively high voltage accelerating potential is required to cause the translation of the electrons from the cathode to the tube face. In conventional CRT display circuits, the cathode of the CRT is held at or near ground and a relatively high positive voltage is applied to a so-called second anode. On the other hand, in CRT recording apparatus in which a fiber optic type target is provided in the faceplate of the CRT, as a safety feature, it is desirable that the structure in and around the front of the tube be at or near ground potential. Accordingly, in such tubes, the cathode is biased at a high negative voltage to provide the accelerating potential for the electrodes. In such tubes, it is common to utilize so-called Z-axis modulation techniques wherein the intelligence signal is applied to a control grid adjacent the cathode. In such circuits, it is necessary that the controlled grid be biased at or near the potential of the cathode. In order to apply a ground-referenced intelligence signal to that control grid, it is necessary to provide a coupling circuit which will absorb the large negative potential between the grid and ground. In previous systems, a gaseous voltage regulator has been used to effect the coupling. Such gaseous regulators, unfortunately, have exhibited the tendency to arc, effectively shorting the voltage regulator and applying the high voltage between the cathode and grid of the CRT. Such high voltage across those elements of the CRT will, of course, destroy the CRT.

SUMMARY OF THE INVENTION

It is, accordingly, an object of the present invention to provide an improved coupling circuit for a CRT which avoids the foregoing difficulties.

It is another object of the present invention to provide an improved coupling circuit as set forth and which preserves the integrity of the applied intelligence signal.

In accomplishing these and other objects, there has been provided, in accordance with the present invention, an improved voltage buffering coupling circuit for coupling a ground referenced control signal to a high voltage biased CRT, including all solid state elements, thereby eliminating the tendency of arc breakdown characteristic of gaseous voltage regulator tubes. The circuit includes temperature compensating elements of opposite thermal coefficient characteristics.

BRIEF DESCRIPTION OF THE DRAWING

A better understanding of the present invention may be had from the following detailed description when read in light of the accompanying drawings in which:

FIG. 1 is a schematic diagram of a prior art CRT signal coupling system.

FIG. 2 is a schematic block diagram of a coupling system embodying the present invention.

DETAILED DESCRIPTION

Figure 3:
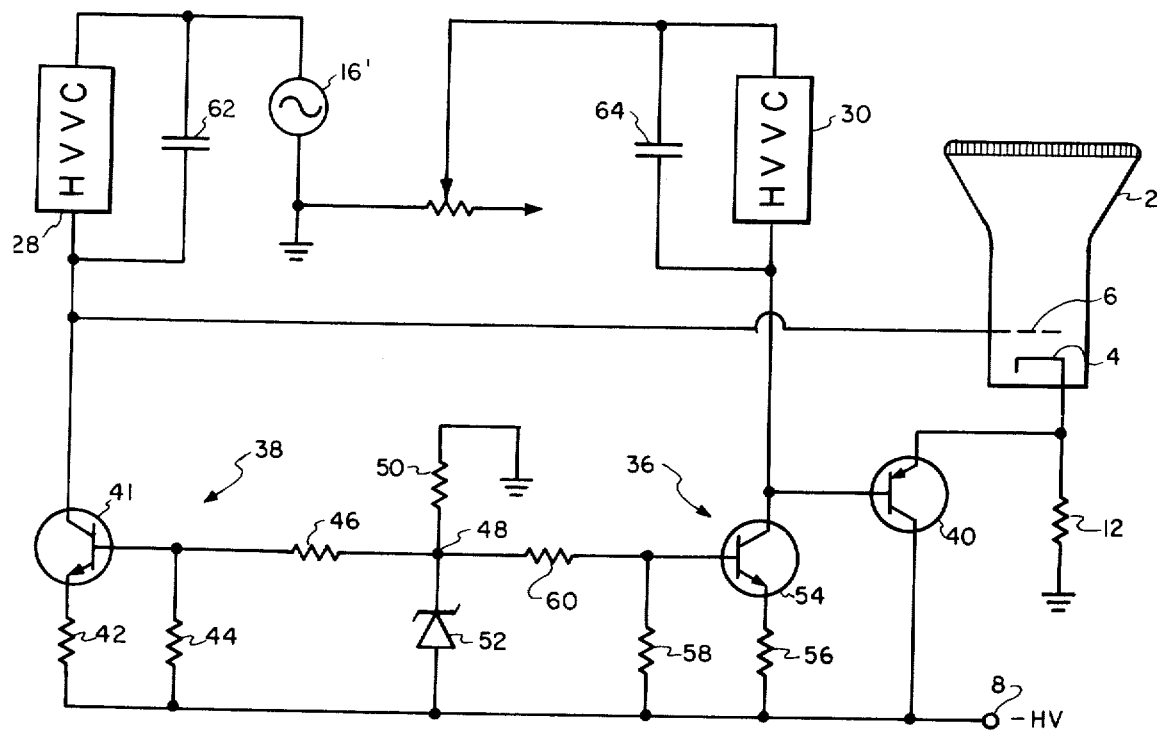
FIG. 3 is a circuit diagram of a system embodying the present invention, similar to the structure shown in FIG. 2 but with certain elements shown in greater detail.

Referring now to the drawings in more detail, there is shown, in FIG. 1, a coupling circuit of the type used heretofor. In that circuit a fiber optics cathode ray tube (FO-CRT) 2 is provided which may be used for recording data signals with the input data signals controlling the Z-axis modulation of the cathode ray beam. To this end, there is provided a cathode 4 and a control grid 6. A high voltage power supply is represented by the battery 8. The battery, or power supply, 8, has its positive terminal connected to ground while its negative terminal is connected through a zener diode 10 to the cathode 4 of the CRT 2. The cathode 4 is also connected through a large resistor 12 to ground. The negative terminal of the power supply 8 is also coupled through a large resistor 14 to the control grid 6 of the FO-CRT 2.

Data signals are applied to the system from a video amplifier, represented in the drawing by a signal generator 16, which are fed through a load resistor 18 to the input of an amplifier 20. The amplifer 20 has its emitter connected to ground and its collector connected through a load resistor 22 to a power supply source 24. The collector of the amplifier 20 is also connected through a gaseous voltage regulator tube 26 to the control grid 6 of the FO-CRT 2. In an exemplary circuit, the high voltage power supply was typically −2700 volts while the power supply source 24 was on the order of 180 volts.

In operation the −2700 volts is applied substantially to both the cathode 4 and the control grid 6 through the resistor 14, the zener 10 and the resistor 12. The control signal 16 is referenced to ground. The voltage regulator tube 26 interposed between the signal source and the control grid 6 is arranged to absorb about 2600 volts. That is, a voltage drop of 2600 volts appears across the regulator tube 26, thus effectively isolating or buffering the high voltage power supply from the ground referenced input signal of the amplifier 20. The control signal from the video input is applied through the amplifier 20 and the regulator tube 26 to the control grid 6 of the FO-CRT 2.

Although the regulator tubes 26 are designed to withstand the voltage levels for which they are used, occasionally they will develop an arc condition across the electrodes thereof. When such an arc condition develops, the grid of the FO-CRT 2 is referenced to ground. Accordingly, substantially the full force of the high voltage supply will be applied between the cathode 4 and the grid 6 of the FO-CRT 2, destroying the utility of the FO-CRT 2. The resulting damage also destroys the utility of the voltage regulator 26. Under such circumstances, both the regulator 26 and the CRT 2 must be replaced before the recording system can be again utilized.

In FIG. 2, there is shown a schematic diagram for a high voltage FO-CRT recording system which effectively isolates the high voltage power supply from the ground referenced input signal and still preserves the integrity of the video input signal. In the circuit of FIG. 2 there is also shown an FO-CRT 2 having a cathode 4 and an anode 6. The cathode 4 is, again, coupled through a large resistor 12 to ground. As in FIG. 1, a video signal source is represented by the generator 16 which is coupled through a coupling resistor 18 to the input of an input amplifier 20, the emitter of which is connected back to ground while the collector is connected through a load resistor 22 to a voltage source 24. The collector of the amplifier 20 is coupled through a high voltage video coupler 28 to the grid 6 of the FO-CRT 2. A second high voltage video coupler 30 is connected in the cathode path of the FO-CRT 2. To this end a voltage divider comprised of a fixed resistor 32 and a slide wire resistor 34 is connected between the voltage source 24 and ground. A slider on the slide wire resistor 34 is coupled to the high voltage video coupler 30 to effect a selectively variable cathode bias adjustment. The other terminal of the coupler unit 30 is connected to the negative high voltage source 8 through a constant current circuit 36. A similar constant current circuit 38 is connected between the high voltage video coupler 28 and the high voltage power source 8. The current for the cathode 4 is controlled by the constant current device 36 through the medium of an emitter follower amplifier 40. In the structure shown in FIG. 2, the high voltage video couplers 28 and 30 are substantially identical and comprise solid state coupling units, as will be described in more detail hereinafter.

Inasmuch as the coupling units are, indeed, solid state devices, any change in current causes the voltage drop across the video couplers to change. Accordingly, the current through each of the two video couplers 28 and 30 is held constant by the constant current circuits 36 and 38 respectively. Inasmuch as the solid state coupling devices are basically temperature sensitive, as will be seen, hereinafter, there are temperature compensating elements within the coupling circuit. The compensation, however, is effective at a steady state condition. Under dynamic conditions such as on start-up or turning on the system, powering the system up, the compensation is not as effective. Accordingly, in order to maintain a proper balance on the system, two sets of high voltage video coupling units are employed, one in the grid circuit and the other in the cathode circuit.

In FIG. 3, there is shown a system which is substantially in accordance with that shown in FIG. 2 but with the greater detail shown relative to the constant current control circuits. In FIG. 3, the video input circuit including the amplifier is shown lumped into a single generator 16'. The constant current circuit 38 includes a current control transistor 41 having its collector connected to the high voltage video coupler 28, its emitter is connected through a resistor 42 to the negative high voltage supply source 8. The base of the transistor 41 is connected through a resistor 44 to the high voltage supply source 8 and through a resistor 46 to a junction 48. The junction 48 is connected through a resistor 50 to ground and through a zener diode 52 to the high voltage supply lead 8. The zener diode 52 and the resistor 50 provide a reference source for the constant control of the current through the transistor 41.

Similarly, the constant current circuit 36 includes a transistor 54 having its collector connected to the high voltage video coupler 30 and its emitter coupled through a resistor 56 to the negative high voltage terminal 8. The base of the transistor 54 is connected through a resistor 58 to the high voltage terminal 8 and through a resistor 60 to the junction 48. Thus, the zener 52 and the resistor 50 provide a bias source at the junction 48 for the control of the constant current through the transistor 54. The interconnection of the two constant current devices to the same reference junction allows the two constant current control devices to track each other.

A first capacitor 62 is connected around the high voltage video coupler 28. The capacitor 62 comprises a high voltage capacitor and provides a low impedance path for high frequency signals directly from the signal source to the control grid of the FO-CRT 2. Similarly, a second capacitor 64, again a high voltage capacitor, is connected across the high voltage video coupler 30. The capacitor 64 provides a low impedance signal return around the high voltage video coupler 30. In practice, the control signals may vary in frequency from a d.c. on steady state to 10 MHz. The cathode current for the cathode 4 of the FO-CRT 2 is drawn primarily through the emitter follower transistor 40 under the control of the constant current circuit 36. This arrangement allows the relatively large cathode current to be controlled by the constant current device 36 without imposing a significant load on the constant current device 36 which, would tend to upset the balance the two constant current devices 36 and 38.

Figure 4:
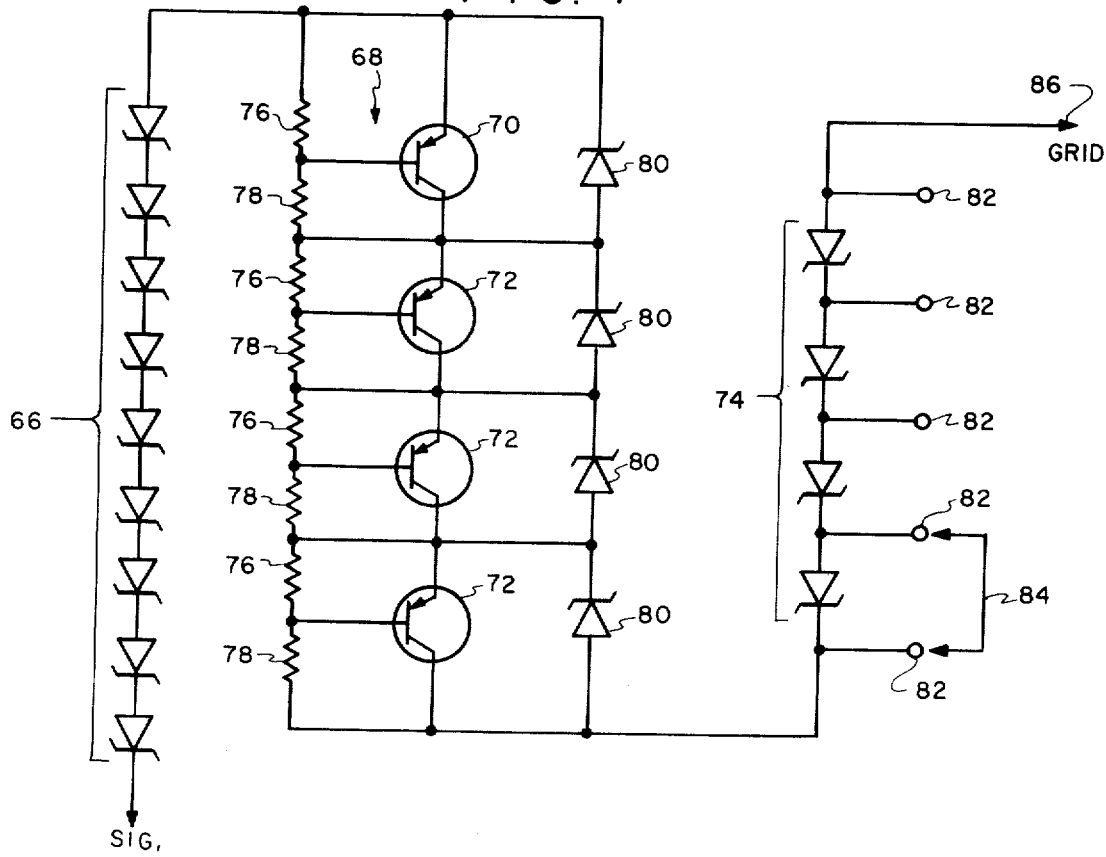
FIG. 4 is a schematic diagram of a preferred structure of a high voltage coupling unit embodying the present invention.

In FIG. 4 there is shown a circuit diagram for a solid state, high voltage, video coupler unit constructed in accordance with the present invention. It will be recalled that in the exemplary embodiment of the present invention, the high voltage supply was established at a negative 2700 volts. In the prior art structure, the gaseous voltage regulator was chosen to exhibit a voltage drop of 2600 volts. In the exemplary embodiment of the present invention, the solid state high voltage coupler is also designed to exhibit a voltage drop of substantially 2600 volts. Thus, the structure illustrated in FIG. 4 includes a plurality of serially connected zener diode voltage regulating devices 66. In the exemplary embodiment each of these zener diodes 66 was chosen to exhibit a voltage drop of 200 volts.

Serially connected with the zener diodes 66 is a plurality of transistor circuits 68. The first of the transistor circuits includes a transistor 70 having its emitter connected to the anode of the uppermost of the zener diodes 66. The subsequent transistor circuits 68 after the first include transistors 72 each having the emitter connected to the collector of the preceding transistor. The collector of the last of the transistors 72 in the transistor circuits 68 is connected to the cathode of the first zener diode of a second plurality of zener diodes 74, the zener diodes 74 again being serially connected. Each of the transistor circuits 68 includes a relatively small resistor 76 connected between the base of the associated transistor 70 or 72 and the emitter thereof. The transistor circuits also include a relatively large resistor 78 connected between the base and collector of each of the associated transistors 70 or 72. These resistors connected thus with the transistors 70 and 72, in the exemplary embodiment, provide a voltage drop across each of the transistors of substantially 150 volts. As thus connected, each of the transistors exhibits a relatively constant voltage drop similar to that exhibited by a zener diode. A zener diode 80 is connected across the emitter collector path of each of the transistors 70 and 72 and serve as overvoltage protection devices for the transistors 70 and 72 respectively. The zener diodes 80 are rated at a higher voltage drop than the transistor circuits; they do not conduct and have no effect on the operation of the circuit other than the aforementioned overvoltage protection.

Although the zener diodes 74 are serially connected between the last of the transistor circuits 68 and the output circuit to the FO-CRT elements, contact terminals 82 are provided around each of the zener diodes 74. The contacts 82 may be selectively bridged by a jumper 84. The jumper 84 in association with the zener diodes 74 provide a means for selectively adjusting the value of the total circuit to closely approximate the desired voltage drop characteristic. The zener diodes 74 are selected to be of progressively different voltage characteristic. In the exemplary embodiment, the four illustrated zener diodes 74 are respectively selected to provide individual voltage drops of 200 volts, 100 volts, 50 volts, and 25 volts.

The zener diodes 66 and 74 are all characterized by a positive temperature coefficient of voltage change. On the other hand, the transistor circuits 68 are characterized by a negative temperature coefficient of voltage change. The absolute value of the temperature coefficient of voltage change for the transistor circuits is significantly larger than the absolute value of the temperature coefficient voltage change for each of the zener diodes. Accordingly, the total number of zener diodes and transistor circuits are determined by the total value of the desired voltage drop. The number of the zener diodes relative to the number of transistor circuits is a function of balancing the negative temperature coefficients against the positive temperature coefficients to produce a net temperature coefficient of voltage change approaching zero.

In the exemplary embodiment, the desired voltage drop for the high voltage video coupler was approximately 2600 volts. Each of the transistor circuits were arranged to produce a voltage drop of substantially 150 volts. The illustrated four such transistor circuits produce a total voltage drop of 600 volts. The nine serially connected zener diodes 66 produce an additional voltage drop of 1800 volts, each of the zener diodes 66 being selected to have a voltage drop of 200 volts. The first occurring of the serially connected zener diodes 74 is also nominally a 200 volt zener. Nominally that zener should provide the additional 200 volts to constitute the 2600 volt drop for the entire assembly. In order to accommodate variations in the actual value of the several components, the zener diodes in the series string 74 are selected to be of progressively smaller voltage drop characteristics. The jumper 84 may be used to bypass such of the zeners in the series string 74 as are not needed to provide the desired voltage drop for the entire assembly. It will be appreciated that the order of voltage characteristic change of the diodes 74 may be inverted without departing from the spirit and scope of the present invention.

In the exemplary embodiment it was found that the negative temperature coefficient characteristic of the four transistor circuits 68 substantially balanced the positive temperature coefficients of the ten zener diodes. That temperature coefficient balance, of course, is significant in a steady state condition of the operation of the circuit. In a dynamic situation, such as during start-up conditions when the recording system is first turned on, the balance between the negative and positive temperature coefficients will not be balanced inasmuch as the junctions of the zener diodes and the transistors do not have the same thermal time constant and the current density is substatially lower in the transistors than in the zener diodes. In addition, the temperature rise due to self heating is different in the two types of devices. As hereinbefore noted, in order to maintain the balance in the effective voltage drop characteristics between the grid and cathode of the CRT 2, two such high voltage video coupler circuits are incorporated into the system. The one high voltage video coupler circuit 28 is connected between the ground referenced signal source and the grid 6 of the FO-CRT 2. The other high voltage video coupler circuit 30, which is substantially identical in its internal structure, is connected between ground and the cathode circuit of the FO-CRT 2. Thus, even though under dynamic conditions such as start-up the temperature coefficient characteristics of the two high voltage video couplers 28 and 30 are not individually balanced to approach zero, the two couplers would be unbalanced in substantially the same degree and maintained the relative voltage characteristic between the cathode 4 and the grid 6 of the FO-CRT 2 without damage to the tube, and without significant change in the CRT beam intensity.

Inasmuch as the high voltage video couplers 28 and 30 are, indeed, solid state devices, they would be sensitive to any changes in current through those circuits which changes might be incident to changes in power supply, the current through each of the high voltage video couplers is controlled to be substantially constant by the constant current control circuits 36 and 38. Since the two constant current control circuits 36 and 38 are both controlled from the same reference, that is, the zener diode 52, the controlled current through the two high voltage video couplers 28 and 30 will be maintained constant and balanced. In the constant current control circuit 36, the resistors 58 and 60 comprise a voltage divider to establish a proper reference voltage for the base of the transistor 54. Similarly, in the constant current control circuit 38 the resistors 44 and 46 also comprise a voltage divider circuit for establishing the proper bias for the base of the transistor 41.

The transistor 40 and the resistor 12 in the cathode circuit of the CRT 2 comprise an emitter follower for controlling the cathode current for the CRT 2. The emitter follower is under the control of the constant current control circuit 36 but without loading the transistor 54 thereof, thereby not affecting the balance of current to the two high voltage video couplers.

Thus, there has been provided, in accordance with the present invention, an improved solid state high voltage video coupler arrangement for coupling a ground referenced signal to a high voltage cathode circuit of a CRT, which coupler circuits is characterized in the improbability of a voltage breakdown such as would result in damage to the CRT and yet which preserves the integrity of the applied video signal.

We claim:

1. A coupling system for coupling a ground referenced control signal to a high voltage energized cathode ray tube, said system comprising:

a ground referenced control signal source means, a cathode ray tube having a cathode and a control grid, a high voltage biasing means connected to bias said cathode and control grid to a high negative potential, coupling circuit means connected between said signal source means and said cathode ray tube for coupling said control signal to said control grid of said cathode ray tube, said coupling circuit means comprising a plurality of solid state constant voltage elements connected to provide voltage buffering between said high voltage biasing means and said ground referenced source means, said coupling circuit means including first solid state elements having a positive temperature coefficient of voltage change and second solid state elements having a negative temperature coefficient of voltage change, said elements being combined in said coupling circuit means to compensate each other and to produce a net temperature coefficient of voltage change which approaches zero.

2. A coupling system as set forth in claim 1 wherein said coupling circuit means includes two substantially identical coupling circuits, one of said coupling circuits being connected between said signal source means and said control grid of said cathode ray tube, the other of said coupling circuits being connected between said cathode of said cathode ray tube and ground.

3. A coupling system as set forth in claim 2 and characterized by the inclusion of constant current control means connected to maintain a constant current through each of said coupling circuits.

4. A coupling system as set forth in claim 1 wherein said first solid state elements comprise a plurality of serially connected zener diodes and wherein said second solid state elements comprise transistor circuit elements, each connected to provide a predetermined voltage drop thereacross, said transistor circuit elements being serially connected with each other and with said serially connected zener diodes to provide a predetermined voltage drop thereacross, said transistor circuit elements being serially connected with each other and with said serially connected zener diodes to provide a predetermined voltage characteristic for the composite circuit.

5. A coupling system as set forth in claim 4 and including means for selectively adjusting the voltage characteristic of said composite circuit.

6. A coupling system as set forth in claim 5 wherein said means for adjusting includes a further plurality of serially connected zener diodes each having a progressively different voltage characteristic, and means for selectively excluding certain ones of said further plurality of zener diodes to provide a predetermined voltage characteristic of the composite circuit.

* * * * *